Figure 1:
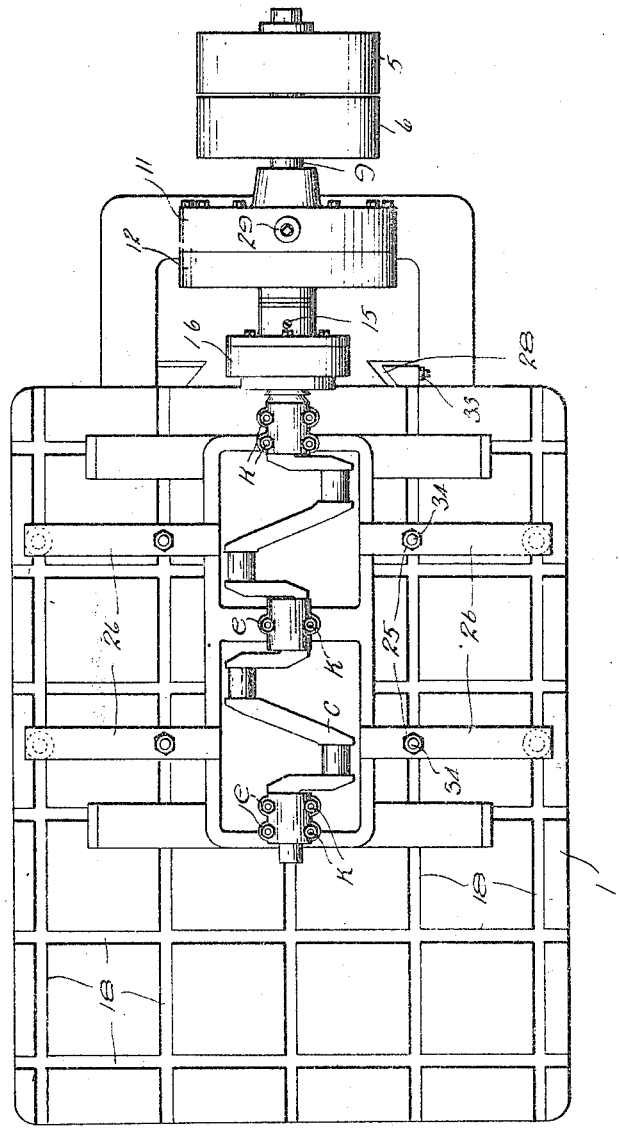

H. W. DEMPSEY.
BEARING FITTING MACHINE.
APPLICATION FILED MAR. 17, 1916.

1,188,156.

Patented June 20, 1916.
2 SHEETS—SHEET 1.

Inventor
Henry W. Dempsey
By
Attorney

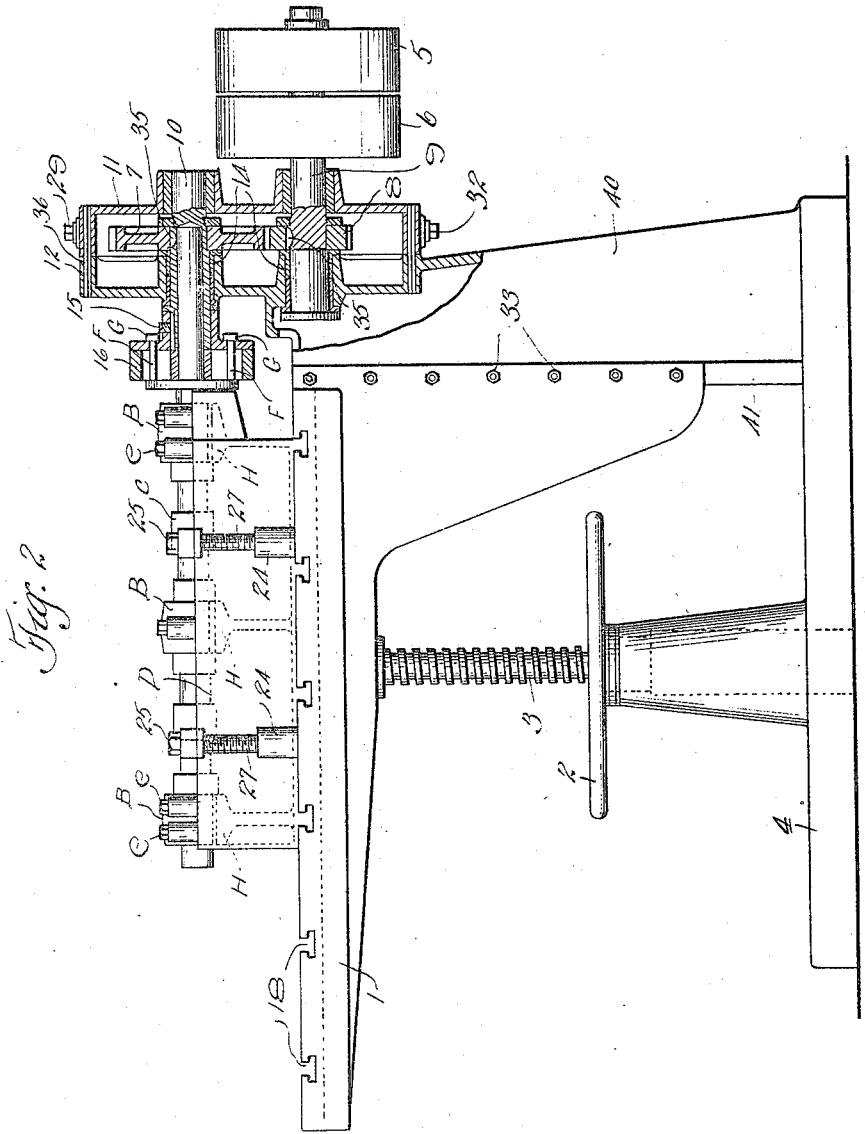

UNITED STATES PATENT OFFICE.

HENRY WILLIAM DEMPSEY, OF DETROIT, MICHIGAN.

BEARING-FITTING MACHINE.

1,188,156. Specification of Letters Patent. Patented June 20, 1916.

Application filed March 17, 1916. Serial No. 84,824.

*To all whom it may concern:*

Be it known that I, HENRY WILLIAM DEMPSEY, citizen of the United States, residing at Detroit, in the county of Wayne and State of Michigan, have invented certain new and useful Improvements in Bearing-Fitting Machines, of which the following is a specification.

This invention relates to machines for fitting bearings, and is particularly adapted and intended for fitting and centering or alining the crank shaft bearings of gasolene or other engines, although it is capable of use in other relations where it is desired to fit a plurality of bearings to a shaft.

In fitting the bearings of crank shafts or the like it is common practice to scrape and true the bearings by hand scrapers, or reamers, and to line them up by individual adjustment to proper position. This requires time and care, and is often unsatisfactory.

The object of the present invention is to provide a machine by means of which this work may be quickly and preferably done, the bearings being rolled in and burnished and centered by rotation of the shaft itself therein, which thus, so to speak, acts as a finishing or fitting tool, which operates on all of the bearings simultaneously and insures a correct fitting and proper surface for all.

The machine includes an adjustable table on which the bearings are mounted and centered with respect to a driving spindle and which may be clutched to the shaft which fits the bearings, and the shaft so clutched is rotated by the spindle to bring down the bearings to the proper alinement and surface, in much less time and at a much smaller cost, and at more perfect results, than when the work is done by hand.

A machine embodying the invention is illustrated in the accompanying drawings in which—

Figure 1 is a plan of the machine. Fig. 2 is a side elevation, partly in section.

Referring specifically to the drawings, 4 indicates the base of the machine, at one end of which is a vertical standard 40, having on one side a dove-tailed guide 41 for the vertically adjustable table 1, a gib 28 and gib screws 33 being provided to fit the table to the guide and to take up wear. The table is raised or lowered by a screw 3 and hand wheel 2 mounted between the table and the base. The top of the table has crossed T-slots 18, for the adjustment of the clamps which hold the work thereto.

A gear case 12, and its cover 11, are mounted on the standard 40, and support a drive shaft 9 provided with a drive pulley 6 and a loose pulley 5, and this shaft carries a pinion 8 in the case, which meshes with a gear 7 on the driven shaft or spindle 10 supported in bearings on the case, the bearings for both of the shafts being indicated at 14, and the keys for the gears at 35. The spindle projects from the gear case on the side toward the table and is provided with a chuck 16, held by a set screw 15 and arranged to be faced against the flange of the crank shaft C and attached thereto by the shaft studs F and nuts G.

D illustrates the crank case of an engine which is supported in inverted position on the table 1 and is secured thereto by clamp bars 26 the inner ends of which lap the rim of the crank case, and which are secured to the table by clamp jacks 24 and jack screws 27, which support the outer ends of the clamp bars, and clamp bolts 34 with nuts 25 by means of which pressure is applied to the clamp bars, the heads of the jacks and bolts taking into the T-slots in the table.

The vertical adjustment of the table, and the adjustment of the clamps permitted by T-slots, enable crank shafts of various sizes or kinds of engines to be centered exactly with the spindle 10, and coupled thereto.

The upper crank shaft bearings, which are below in the inverted position of the crank case, are indicated at H, and the lower bearing caps are indicated at B, these caps being adjustable by nuts E on the studs K.

The gear case has a plug 29 for filling with oil, and an oil drain plug 32, and dowel pins 36 to fit the cover to the body of the case.

In operation, the crank case D is first placed on the table and roughly adjusted to position. The bearing caps B are then removed and the crank shaft C positioned in its upper bearings H. The caps B are then replaced and tightened down to a tension just insufficient to freeze the bearings. Then by turning the adjusting screw 3 the crank shaft is exactly centered with the chuck 16, and coupled therewith by the studs F and the nuts G, and the clamps 25 are then tightened on the crank case. Power is then applied to the drive pulley 6, and by means of the gears the crank shaft is finally rotated and the bearing caps are tightened down on the crank shaft as evenly as possible. The rotation of the crank shaft with the bearing caps tightened down heavily wears down its bearings to an even face and exact alinement, all of the bearings being fitted and finished in one operation. The crank shaft may then be disconnected from the chuck and removed and the bearings cleaned, and oil grooves cut if desired in the bearings H and B, the caps being finally replaced. If necessary, the usual shims may be inserted under the bearing caps, to fit the same to the crank shaft. The crank case and shaft may then be removed from the table and replaced in the engine.

The invention is not limited to the exact machine shown and described, but may be embodied in various other forms within the scope of the following claims.

What I claim is:

1. In a machine for fitting shaft bearings, the combination of a driven spindle, means to support a shaft and its bearings, said means being adjustable to center the shaft and spindle, and means to couple the shaft and the spindle.

2. In a machine for fitting shaft bearings, the combination of a spindle, an adjustable table adapted to support a crank case and shaft, clamps on the table, engageable with the crank case to fasten the same to the table, and driving connections between the spindle and the crank shaft.

3. In a machine for fitting shaft bearings, the combination of a base having a guide standard thereon, a spindle mounted on the standard, means to drive the spindle, a table adjustable on the standard to support and center the shaft and bearings with respect to the spindle, and a coupling engageable between the spindle and the shaft.

4. In a machine for fitting shaft bearings, the combination of a base having a standard thereon, one side of the standard being provided with a guide, a table adjustably supported on the base and slidable at one side on said guide, means on the table to clamp the shaft bearings thereto, a spindle mounted on the standard and projecting at one end above the table, and means to couple said end of the spindle to the shaft.

In testimony whereof, I affix my signature in presence of two witnesses.

HENRY WILLIAM DEMPSEY.

Witnesses:
ANNIE STEWART,
EARLE M. FRENCH.